(12) United States Patent
Onggosanusi et al.

(10) Patent No.: US 10,306,597 B2
(45) Date of Patent: May 28, 2019

(54) METHOD AND APPARATUS FOR BEAM-LEVEL RADIO RESOURCE MANAGEMENT AND MOBILITY IN CELLULAR NETWORK

(71) Applicant: Samsung Electronics Co., Ltd, Suwon-si (KR)

(72) Inventors: Eko Onggosanusi, Allen, TX (US); Thomas David Novlan, Dallas, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 15/204,925

(22) Filed: Jul. 7, 2016

(65) Prior Publication Data

US 2017/0026938 A1    Jan. 26, 2017

Related U.S. Application Data

(60) Provisional application No. 62/195,082, filed on Jul. 21, 2015, provisional application No. 62/352,799, filed on Jun. 21, 2016.

(51) Int. Cl.
*H04W 72/04*      (2009.01)
*H04W 24/10*      (2009.01)
(Continued)

(52) U.S. Cl.
CPC .......... *H04W 72/04* (2013.01); *H04B 7/0626* (2013.01); *H04L 5/0051* (2013.01);
(Continued)

(58) Field of Classification Search
CPC ... H04W 72/04; H04W 24/10; H04W 72/046; H04L 5/00; H04L 5/0053; H04L 5/0051; H04L 5/0094; H04L 5/0023; H04B 7/0626
See application file for complete search history.

(56) References Cited

U.S. PATENT DOCUMENTS

2013/0028182 A1*    1/2013   Geirhofer ............ H04B 7/0626
                                                            370/328
2013/0163544 A1    6/2013   Lee et al.
(Continued)

FOREIGN PATENT DOCUMENTS

WO    2014116928 A1    7/2014
WO    2015020505 A1    2/2015
(Continued)

OTHER PUBLICATIONS

International Search Report dated Oct. 26, 2016 in connection with International Application No. PCT/KR2016/007943, 3 pages.
(Continued)

*Primary Examiner* — Ian N Moore
*Assistant Examiner* — Justin T Van Roie

(57) ABSTRACT

Methods and apparatuses for beam-level radio resource management and mobility are provided. A user equipment (UE) includes a transceiver and at least one processor operably connected to the transceiver. The transceiver is configured to receive measurement resource configuration information that includes at least one measurement reference signal (RS) resource configuration, transmit a trigger request, and receive a measurement report trigger. The at least one processor is configured to calculate, in response to receipt of the measurement report trigger, a measurement report from a measurement RS. The transceiver is further configured to transmit the measurement report. The RS resource configuration is associated with a radio resource unit.

14 Claims, 15 Drawing Sheets

(51) Int. Cl.
*H04B 7/06* (2006.01)
*H04L 5/00* (2006.01)
(52) U.S. Cl.
CPC .......... *H04L 5/0053* (2013.01); *H04L 5/0094* (2013.01); *H04W 24/10* (2013.01); *H04L 5/0023* (2013.01); *H04W 72/046* (2013.01)

(56) References Cited

U.S. PATENT DOCUMENTS

| | | | |
|---|---|---|---|
| 2013/0272263 A1* | 10/2013 | Pi | H04W 72/042 370/330 |
| 2014/0044044 A1 | 2/2014 | Josiam et al. | |
| 2014/0247741 A1 | 9/2014 | Yamada | |
| 2015/0146561 A1 | 5/2015 | Jung et al. | |
| 2016/0226640 A1 | 8/2016 | Seol et al. | |
| 2017/0195998 A1* | 7/2017 | Zhang | H04B 7/086 |

FOREIGN PATENT DOCUMENTS

| | | | | |
|---|---|---|---|---|
| WO | 2015060645 A1 | 4/2015 | | |
| WO | WO-2016044994 A1 * | 3/2016 | | H04B 7/086 |

OTHER PUBLICATIONS

Written Opinion of the International Searching Authority dated Oct. 26, 2016 in connection with International Application No. PCT/KR2016/007943, 8 pages.
3GPP TS 136.211 V12.3.0 (Sep. 2014)Technical Specification Group Radio Access Network; Evolved Universal Terrestrial Radio Access (E-UTRA); Physical channels and modulation (Release 12) 124 Pages.
3GPP TS 136.212 V12.3.0 (Dec. 2014) Technical Specification Group Radio Access Network; Evolved Universal Terrestrial Radio Access (E-UTRA); Multiplexing and channel coding (Release 12) 89 Pages.
3GPP TS 136.213 V12.3.0 (Sep. 2014)Technical Specification Group Radio Access Network; Evolved Universal Terrestrial Radio Access (E-UTRA); Physical layer procedures (Release 12) 212 Pages.
3GPP TR 36.872 V12.0.0 (Sep. 2013) 3rd Generation Partnership Project; Technical Specification Group Radio Access Network; Small cell enhancements for E-UTRA and E-UTRAN—Physical layer aspects (Release 12) 78 Pages.
3GPP TS 36.133 V11.7.0 (Dec. 2013) 3rd Generation Partnership Project; Technical Specification Group Radio Access Network; Evolved Universal Terrestrial Radio Access (E-UTRA); Requirements for support of radio resource management (Release 11)—789 Pages.
Extended European Search Report regarding Application No. 16828076.6, dated Jun. 19, 2018, 9 pages.
Samsung, "Discussion on Beam Measurement for 5G New Radio Interface in mmWave Frequency Bands", 3GPP TSG RAN WG2 #94, R2-163652, May 2016.
European Patent Office, "Communication pursuant to Article 94(3) EPC," Application No. EP16828076.6, dated Mar. 4, 2019, 5 pages.

* cited by examiner

METHOD AND APPARATUS FOR BEAM-LEVEL RADIO RESOURCE MANAGEMENT AND MOBILITY IN CELLULAR NETWORK

CROSS-REFERENCE TO RELATED APPLICATIONS AND CLAIM OF PRIORITY

This application claims priority under 35 U.S.C. § 119(e) to U.S. Provisional Patent Application Ser. No. 62/195,082 filed Jul. 21, 2015 and U.S. Provisional Patent Application Ser. No. 62/352,799 filed Jun. 21, 2016. The above-identified provisional patent application is hereby incorporated by reference in its entirety.

TECHNICAL FIELD

The present disclosure relates generally to wireless communication systems and, more specifically, to beam-level radio resource management and mobility methods.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for codebook design and signaling.

In one embodiment, a user equipment (UE) is provided. The UE includes a transceiver and at least one processor operably connected to the transceiver. The transceiver is configured to receive measurement resource configuration information that includes at least one measurement reference signal (RS) resource configuration, transmit a trigger request, and receive a measurement report trigger. The at least one processor is configured to calculate, in response to receipt of the measurement report trigger, a measurement report from a measurement RS. The transceiver is further configured to transmit the measurement report. The RS resource configuration is associated with a radio resource unit.

In another embodiment, a base station (BS) is provided. The BS includes at least one processor and a transceiver operably connected to the processor. The at least one processor is configured to generate configuration information to configure a UE with at least one measurement RS resource configuration. The RS resource configuration is associated with a radio resource unit. The transceiver is configured to receive a trigger request from the UE, transmit a measurement report trigger to the UE, and receive a measurement report from the UE.

In another embodiment, a method for operating a UE is provided. The method includes receiving, by the UE, measurement resource configuration information that includes at least one measurement RS resource configuration and transmitting, by the UE, a trigger request. The method also includes receiving a measurement report trigger and, in response to receipt of the measurement report trigger, calculating, by the UE, a measurement report from a measurement RS. Additionally, the method includes transmitting the measurement report. The RS resource configuration is associated with a radio resource unit The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
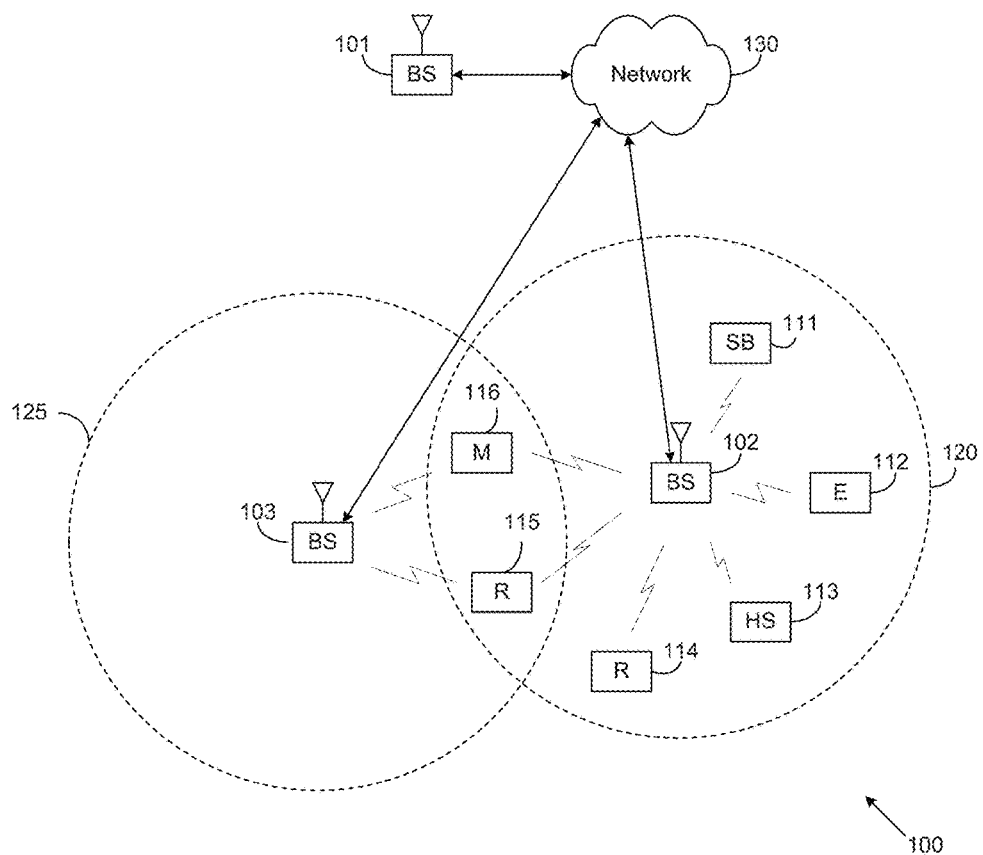
FIG. 1 illustrates an example wireless network according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

ACK Acknowledgement
ARQ Automatic Repeat Request
CA Carrier Aggregation
CQI Channel Quality Indicator
C-RNTI Cell RNTI
CRS Common Reference Signal
CSI Channel State Information
CSI-RS Channel State Information Reference Signal
DCI Downlink Control Information
DL Downlink
DMRS Demodulation Reference Signal
DTX Discontinuous Transmission
DRX Discontinuous Reception
EPDCCH Enhanced PDCCH
FDD Frequency Division Duplexing
HARQ Hybrid ARQ
IE Information Element
MCS Modulation and Coding Scheme
MBSFN Multimedia Broadcast multicast service Single Frequency Network
O&M Operation and Maintenance
PCell Primary Cell
PCI Physical Cell Identity
PDCCH Physical Downlink Control Channel
PDSCH Physical Downlink Shared Channel
PMCH Physical Multicast Channel
PMI Precoding Matrix Indication or Indicator
PRB Physical Resource Block
PRS Positioning Reference Signal
PSS Primary Synchronization Signal
PUCCH Physical Uplink Control Channel
PUSCH Physical Uplink Shared Channel
QAM Quadrature Amplitude Modulation
QoS Quality of Service
QPSK Quadrature Phase Shift Keying
RACH Random Access Channel
RE Resource Elements
RI Rank Indication
RNTI Radio Network Temporary Identifier RRC Radio Resource Control
RS Reference Signals
RSRP Reference Signal Received Power
SCell Secondary Cell
SCH Synchronization Channel
SFN System Frame Number
SIB System Information Block
SINR Signal to Interference and Noise Ratio
SSS Secondary Synchronization Signal
SR Scheduling Request
SRS Sounding RS
TA Timing Advance
TAG Timing Advance Group
TB Transport Block
TBS TB Size
TDD Time Division Duplexing
TPC Transmit Power Control
UCI Uplink Control Information UE User Equipment
UL Uplink
UL-SCH UL Shared Channel The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Depending on the network type, the term "base station" or "BS" can refer to any component (or collection of components) configured to provide wireless access to a network, such as transmit point (TP), transmit-receive point (TRP), an enhanced base station (eNodeB or eNB), a macrocell, a femtocell, a WiFi access point (AP), or other wirelessly enabled devices. Base stations may provide wireless access in accordance with one or more wireless communication protocols, e.g., 5G 3GPP New Radio Access Technology (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The BS 102 provides wireless broadband access to the network 130 for a first plurality of user equipments (UEs) within a coverage area 120 of the BS 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 can communicate with each other and with the UEs 111-116 using 5G NR, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, can have other shapes, including irregular shapes, depending upon the configuration of the BSs and variations in the radio environment associated with natural and man-made obstructions.

As described in more detail below, one or more of BS 101, BS 102 and BS 103 configure a UE with a measurement RS resource configuration that is associated with a radio resource unit and receive a measurement report from the UE. In various embodiments, one or more of UEs 111-116 receive measurement resource configuration information that includes measurement RS resource configuration and calculate a measurement report from a measurement RS.

Although FIG. 1 illustrates one example of a wireless network 100, various changes can be made to FIG. 1. For example, the wireless network 100 could include any number of eNBs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2A:
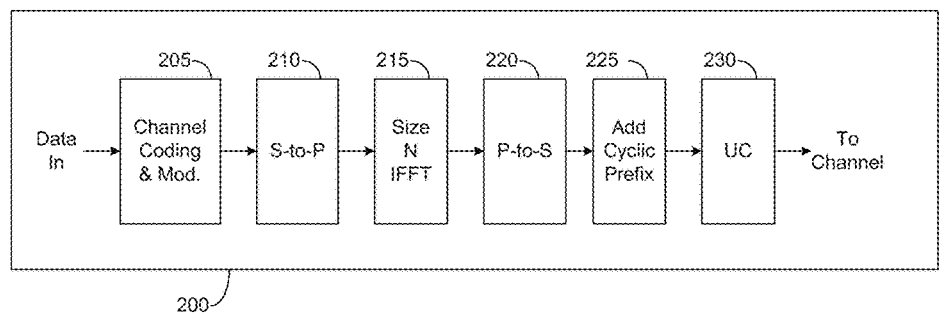
FIGS. 2A and 2B illustrate example wireless transmit and receive paths according to various embodiments of the present disclosure.
Figure 2B:
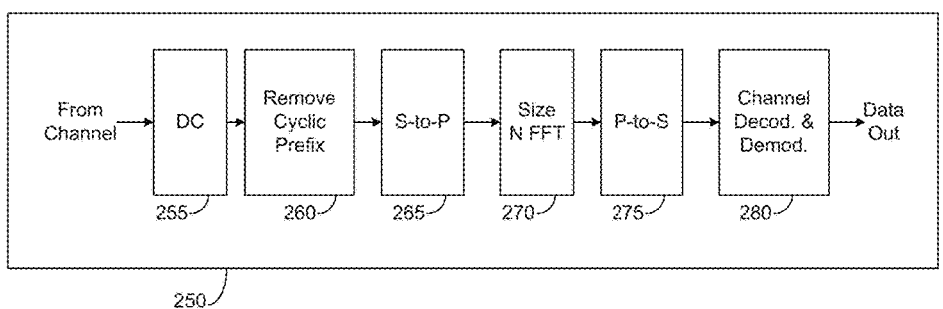

FIGS. 2A and 2B illustrate example wireless transmit and receive paths according to the present disclosure. In the following description, a transmit path 200 can be described as being implemented in a BS (such as BS 102), while a receive path 250 can be described as being implemented in a UE (such as UE 116). However, it will be understood that the receive path 250 could be implemented in a BS and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the BS 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the BS 102 arrives at the UE 116 after passing through the wireless channel, and reverse operations to those at the BS 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for a designed codebook. Each of the BSs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to BSs 101-103 and can implement a receive path 250 for receiving in the downlink from BSs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
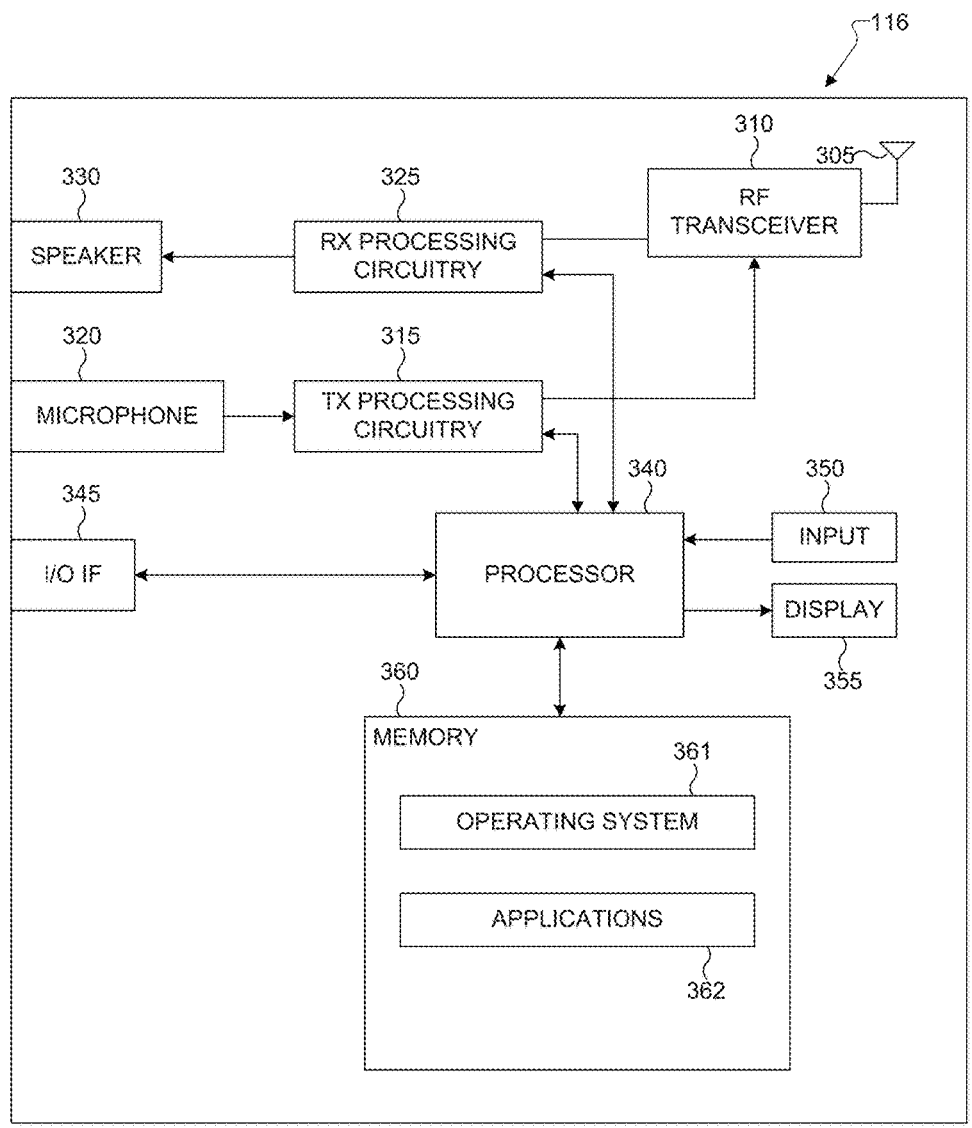
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by a BS of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for calculating a measurement report from a measurement RS as described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from BSs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for a measurement report from a measurement RS. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
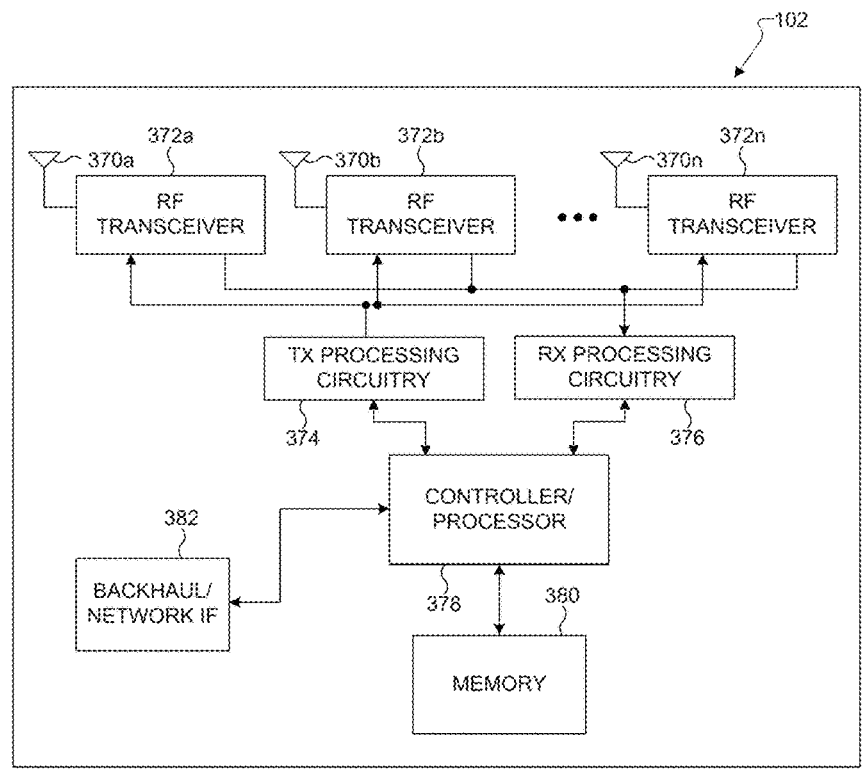
FIG. 3B illustrates an example base station (BS) according to various embodiments of the present disclosure.

FIG. 3B illustrates an example BS 102 according to the present disclosure. The embodiment of the BS 102 shown in FIG. 3B is for illustration only, and other BSs of FIG. 1 could have the same or similar configuration. However, BSs come in a wide variety of configurations, and FIG. 3B does not limit the scope of the present disclosure to any particular implementation of a BS. BS 101 and BS 103 can include the same or similar structure as BS 102.

As shown in FIG. 3B, the BS 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The BS 102 also includes a controller/processor 378, a memory 380, and a backhaul or network interface 382.

The RF transceivers 372a-372n receive, from the antennas 370a-370n, incoming RF signals, such as signals transmitted by UEs or other BSs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the BS 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of configuring a UE with a measurement RS resource configuration that is associated with a radio resource unit for measurement reporting by a UE. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the BS 102 to communicate with other devices or systems over a backhaul connection or over a network. The interface 382 could support communications over any suitable wired or wireless connection(s). For example, when the BS 102 is implemented as part of a cellular communication system (such as one supporting 5G new radio access technology or NR, LTE, or LTE-A), the interface 382 could allow the BS 102 to communicate with other BSs over a wired or wireless backhaul connection. When the BS 102 is implemented as an access point, the interface 382 could allow the BS 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the BS 102 (implemented using the RF transceivers 372a-372n, TX processing circuitry 374, and/or RX processing circuitry 376) configure a UE with a measurement RS resource configuration.

Although FIG. 3B illustrates one example of a BS 102, various changes can be made to FIG. 3B. For example, the BS 102 could include any number of each component shown in FIG. 3B. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the BS 102 could include multiple instances of each (such as one per RF transceiver).

An advanced wireless communications system (for instance, 3GPP 5G new radio interface or 5G NR system) can have a hierarchical architecture comprised of multiple classes of physical and logical entities. Some examples include one system comprising one or more nodes, one node comprising one or more cells, one cell comprising one or more transmission points (TPs) or transmit-receive points (TRPs), and one TP or TRP comprising one or more coverage beams. In addition, utilization of new frequency bands, such as bands within the mmWave regime, beyond the conventional cellular bands (sub-6 GHz) is also within the horizon.

Figure 4:
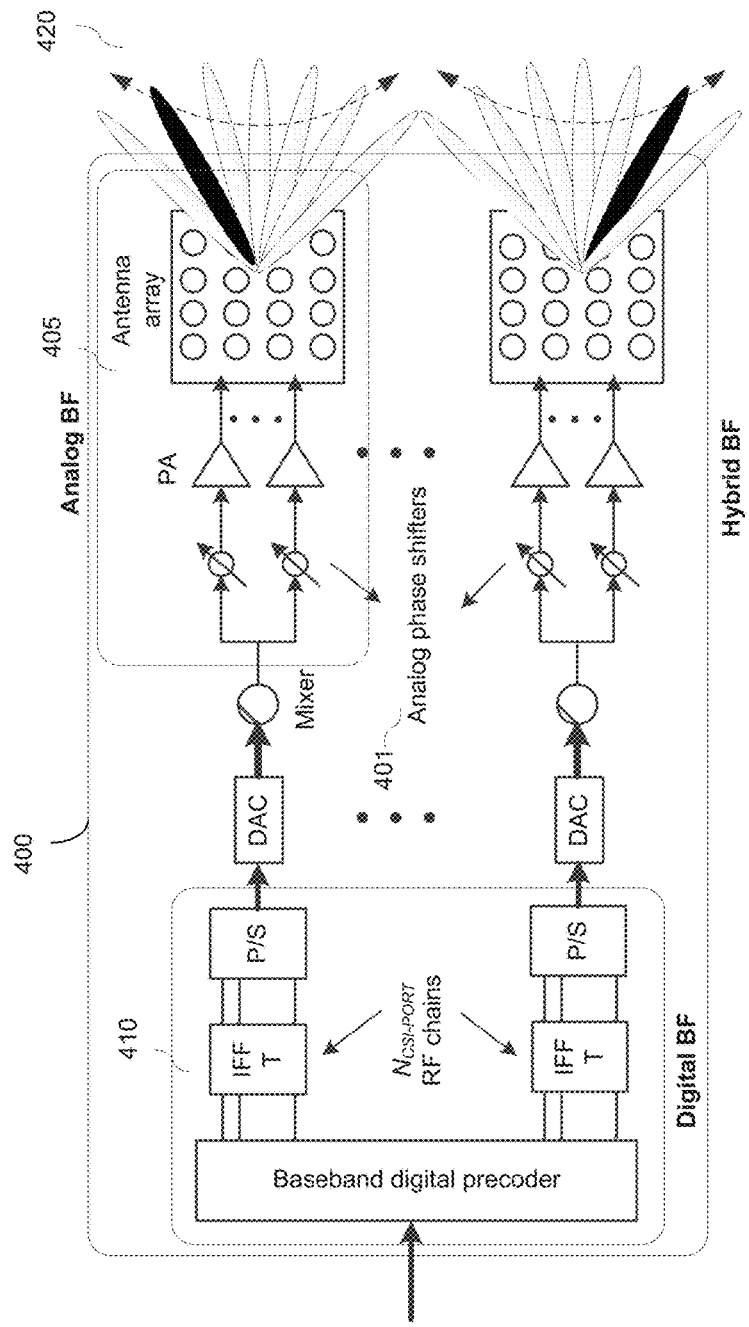
FIG. 4 illustrates an example transmitter with a hybrid beamforming architecture where one digital antenna port is associated with multiple analog antenna ports according to various embodiments of the present disclosure.

FIG. 4 illustrates an example transmitter 400 with a hybrid beamforming architecture where one digital antenna port is associated with multiple analog antenna ports according to various embodiments of the present disclosure. For example, the transmitter 400 may be present within any of the BSs 101-103 or the UEs 111-116 in the network 100 in FIG. 1. The embodiment of the transmitter 400 shown in FIG. 4 is for illustration only. Other embodiments of the transmitter 400 could be used without departing from the scope of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles (420) by varying the phase shifter bank across symbols or subframes. The number of sub-arrays (equal to the number of RF chains) is the same as the number of digital ports $N_{D\text{-}PORT}$ which correspond to distinct number of antenna ports a UE measures to acquire channel state information (CSI). For instance, a digital beamforming unit 410 performs a linear combination across $N_{D\text{-}PORT}$ analog beams to further increase precoding gain. While analog beams are wideband (hence not frequency-selective), digital beamforming or precoding can be varied across frequency sub-bands or resource blocks.

In 3GPP LTE, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR, efficient and unified radio resource acquisition or tracking mechanism which works for various use cases (such as enhanced mobile broadband access eMBB, ultra-reliable low-latency communication or URLLC, massive machine-type communication or mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

In order to achieve synchronization and timing the UE can be informed/acquire one or more node/cell/TP/TRP/beam IDs. For example a cell can be identified by a cell ID which is obtained from the Synchronization Signal (SS). However, in one deployment scenario, all TPs or TRPs of the same cell can be synchronized with the same radio frame/SFN timing. In this case the UE does not need to be aware of the unique TPs/TRPs and a TP/TRP ID is not conveyed by any signaling. However a beam ID may be provided for the UE to identify (for instance, for RRM) different beams transmitted by the TPs/TRPs individually or jointly. For example, the UE is only aware of cells and beams and the SS provides both a cell ID and beam ID. However there are multiple potential disadvantages of a hierarchical approach as described above. One disadvantage is that it requires a significant overhead as the number of beams increases, including overhead related to CSI measurement and potentially frequent coverage/dedicated beam re-selection. In addition, calibration and differentiation of different beams are needed, including tight coordination between TPs or TRPs to determine measurement/candidate CSI-RS sets and alignment of beam-sweeping timing. Furthermore, reliance on a cell-concept is not desirable for operators due to planning requirements.

Therefore, there is a need for a flexible and reduced-overhead and versatile beam-level radio resource management (RRM) and mobility procedures.

In the present disclosure, the network 100 includes two classes of devices: transmit-receive point (TRP) or node which can correspond to an eNodeB or transmission point (TP) in LTE, and user equipment (UE). A radio resource (RR) or a radio resource unit (RRU), with a cell or a "beam" as examples, can be associated with one or multiple TRPs (cf. FIG. 5B) depending on network deployment scenarios. A radio resource can be described as a resource assigned to a UE for transmission and reception of data and control within the network. In the present disclosure, a RRU is associated with a "beam" unless indicated otherwise. The term "beam" as a radio resource unit (RRU) is to be differentiated with, for instance, an analog beam used for beam sweeping in FIG. 4.

The present disclosure describes four distinct schemes, namely, multi-layer or multi-type nodes, UE-centric radio resource management (RRM), beam measurement reference signal (BRS) design, and beam association procedure.

In the first scheme, a communication method utilizing multiple layers or multiple types of communication nodes is described.

Figure 5A:
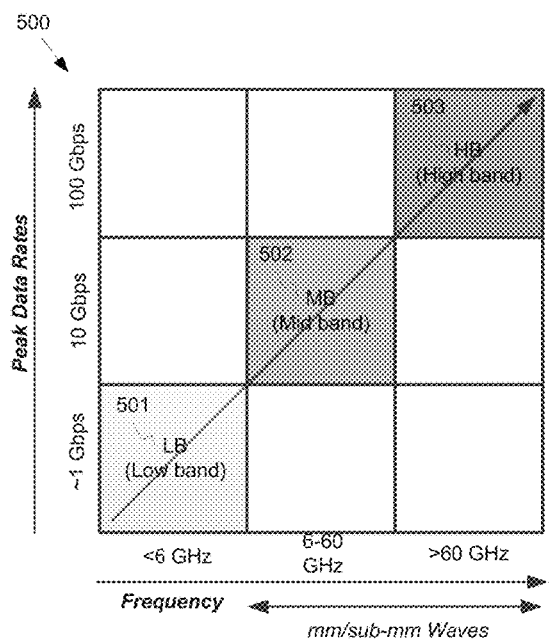
FIG. 5A illustrates a range of peak data rates which can be supported by different carrier frequencies in low-band, medium-band, and high-band regime according to various embodiments of the present disclosure.

In a first method of the first embodiment, an advanced cellular network deployment (for instance, 5G NR) can be comprised of multiple types of nodes (for instance, TRPs or TPs) operating on one or more carrier frequencies. Basic coverage can be provided on one carrier frequency and another carrier frequency can provide higher-rate data transmissions. Basic coverage can include, for example, common and/or dedicated control channels. In addition, it can also include lower-rate data transmission and data transmission with stringent coverage requirements. The coverage carrier is typically lower in frequency and/or smaller in bandwidth than the data carrier (for instance, <6 GHz/5-20 MHz for coverage carrier frequency/bandwidth, 6-100 GHz/200-2000 MHz for the data carrier frequency/bandwidth). FIG. 5A illustrates a range 500 of peak data rates which can be supported by different carrier frequencies in low-band regime 501, medium-band regime 502, and high-band regime 503 according to various embodiments of the present disclosure.

Figure 5B:
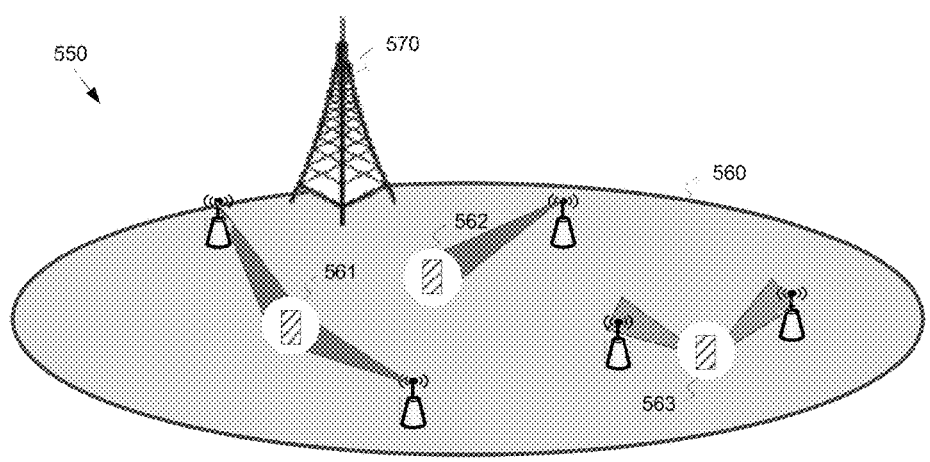
FIG. 5B illustrates an example deployment where coverage is provided on a <6 GHz carrier by a macro cell associated with a macro BS, while small cell TRPs provide data access with beamforming on a millimeter-wave carrier frequency according to various embodiments of the present disclosure.

Several example use cases of this first embodiment are given as follows. In a first example use case, deployment and operation on multiple diverse frequency bands are useful to provide fallback onto the coverage carrier if the data carrier is lost (for instance, due to mobility or lack of link budget margin to support beamforming). FIG. 5B illustrates an example deployment 550 where coverage is provided on a <6 GHz carrier (such as that in regime 501) by a macro cell 560 associated with a macro BS 570, while small cell TRPs provide data access with beamforming on a millimeter-wave carrier frequency (such as that in regime 502). The UEs (561, 562, and 563) may also utilize both the coverage and data carriers according to various embodiments of the present disclosure. In this example, UE 561 is scheduled with a DL transmission from two TRPs while UE 562 is scheduled with a DL transmission from one TRP. The third UE 563 is scheduled with an UL transmission to two TRPs. In a second example use case, the coverage carrier can be the same radio access technology (RAT) as the data carrier. In a third example use case, different RATs can be used for the coverage and data carriers (such as LTE for coverage, new RAT for data carrier). In a fourth example use case, common and/or dedicated control channels are associated with the coverage carrier while data transmissions are associated with (beamformed) data carrier(s). In this case, the coverage carrier can serve as an anchor carrier.

In the second scheme, a UE-centric radio resource management (RRM) method is described.

To enable UE-centric radio resource management (RRM) or mobility, a cell is defined from UE perspective. In this case, a cell—which can include a plurality of sites or transmit-receive points (TRPs) or eNodeBs (eNBs)—is UE-specific. Therefore, UE identification (ID) or a "virtual cell" ID (derived or mapped from a corresponding UE ID) or "super-cell" ID (also derived or mapped from a corresponding UE ID) can be used to identify a cell associated with the UE. Other terms can also be used to describe an ID associated with a region wherein a UE can transmit and receive from at least one TRP without having to engage in a handover procedure. In the present disclosure, handover comprises a change in association (between a UE and a "cell" or a "super-cell") which involves multiple layers such as at least physical layer, MAC layer, and RRC layer.

Furthermore, a radio resource unit (RRU), termed a "beam" for illustrative purposes, comprises a unit where a UE can transmit and receive from at least one TRP within a "cell" (defined above). Furthermore, within a "cell", a UE can be configured with one "beam"/RRU and switched to another. That is, a change in "beam"/RRU association can happen without a UE engaging in a handover process. Furthermore, one "beam"/RRU can be associated with one TRP or a plurality of TRPs. Therefore, a "beam" or RRU ID can be used to identify a "beam"/RRU associated with the UE. Other terms can also be used to describe this entity.

At least two possibilities exist. First, "beam"/RRU change procedure involves the same set of layers as that of handover. Second, "beam"/RRU change procedure involves only a (lower layer) subset of the layers involved in handover. For example, "beam"/RRU change procedure only involves physical layer or, alternatively, physical and MAC layers. In the present disclosure, this "beam"/RRU change procedure can also be termed "beam/RRU level mobility" and is at least included in radio resource management (RRM). In contrast to the conventional RRM which involves UE mobility from one cell to another, this embodiment comprises a RRM method which involves UE mobility from one "beam"/RRU to another without any change in cell association.

Analogous to embodiment 1 on multi-layer access, at least two types of RRUs or "beams" can be defined and associated with a UE: coverage RRU/beam and data (dedicated, which can be beamformed) "beam"/RRU. For the rest of this present disclosure, the term "beam" is used interchangeably with RRU.

In one sub-embodiment of this method for UE-centric RRM, RRM is performed on coverage beam level. When coverage beams are cell-specific, one coverage beam can be perceived as a small cell within a larger cell or a small cell overlaid on a macro-cell. Each coverage beam can be associated with a cell-specific beam measurement RS which can be transmitted periodically.

In another sub-embodiment of this method for UE-centric RRM, RRM is performed on dedicated UE-specific beam level. A set of dedicated beams can be treated as refinements on a coverage beam. In contrast to a coverage beam, a dedicated beam can be associated with a UE-specific beam measurement RS. Since dedicated beams tend to be narrower than coverage beams, a periodic UE-specific beam measurement RS can result in high DL overhead. Therefore, beam mobility can be performed using dynamic on/off or aperiodic UE-specific beam measurement RS transmission. That is, the UE does not rely on cell or beam-specific periodic RS/signaling transmissions. Instead, dynamic on/off of cells/beams is supported with "on-demand" or aperiodic RRM. Since the UE can be served by one or more beams in a coordinated method (for instance, analogous to coordinated multi-point (CoMP) transmission), a UE ID or a "virtual cell ID" is provided for synchronization, "beam"/RRU association, and RRM/mobility.

Figure 6:
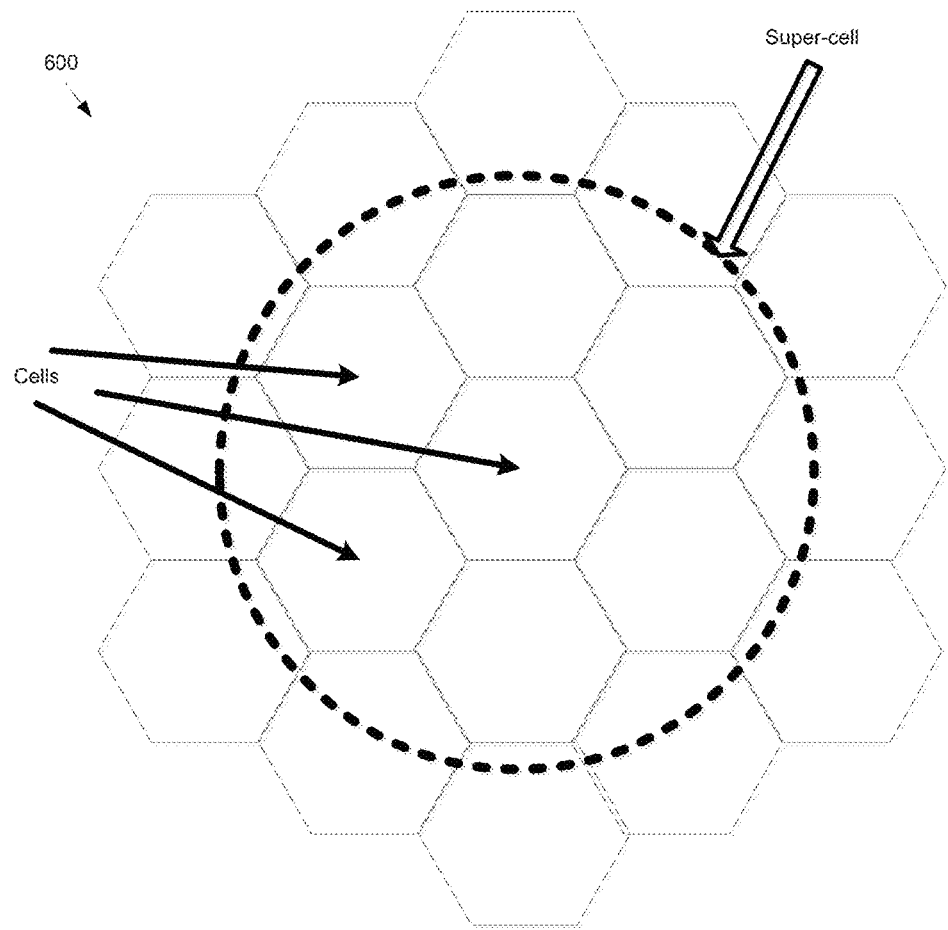
FIG. 6 illustrates an example of how multiple conventional cells can be combined into a single "super-cell" from a UE-specific perspective according to various embodiments of the present disclosure.

FIG. 6 illustrates an example of multiple conventional cells (in this example, 7) combined into a single "super-cell" 600 from a UE-specific perspective according to various embodiments of the present disclosure. As the UE is engaged in beam-level mobility, the virtual cell ID remains the same despite a change in beam association. This allows, for example, the network flexibility in determining which network entities provide control/data transmissions to different UEs.

In this embodiment, the UE is configured with at least one ID ("super-cell ID" or "beam/RRU ID" or both) which is used to identify the UE with a "super-cell" or at least one "beam"/RRU. This ID can be UE-specific. In regard of super-cell, the definition and configuration of the super-cell can be decoupled and/or differently configured between the DL and UL from the perspective of the UE. Several alternatives are given as follows.

In one alternative, super-cell mobility can be achieved by configuring the UE with a different super-cell ID when the UE leaves or approaches the boundary of the super-cell (that is, when handover procedure occurs).

In a second alternative, the UE can keep the super-cell/UE ID regardless of the UE's position within the network, while the network modifies the set of cells or RRUs/beams based on mobility or RRM measurements provided by the UE. In this sense, the mobility procedure is transparent. In this case, the super-cell boundary is configurable and UE-specific. RRM or mobility is handled on the beam level.

In a third alternative, the network can switch between the two alternatives depending on the size of the super-cluster. In this third alternative, the UE can be configured with a super-cell ID and, furthermore, at least one beam ID to identify the radio resource units used for providing control and data transmissions, respectively. The IDs can be configured on the coverage carrier frequency (for instance, by an entity analogous to the LTE PCell) or may be configured by control signaling or provided by system information messages on the data carrier frequency (for instance, using LTE terminology, by the SCell). For example, using FIG. 1 as a reference, the PCell (using LTE terminology) may be carried in a LB, while SCells are carried in MB/HB. Due to the improved coverage of the LB PCell, it provides common control messages, RRC signaling, some dedicated control signaling, while the SCells provide data as well as some dedicated control signaling. This system is known as a non-standalone system (rely on <6 GHz dual connectivity). However the system can be upgraded to provide all control signaling on the higher-band carriers to provide a standalone system operation.

In a fourth alternative, only beam-level ("beam"/RRU) IDs are provided at the UE. In addition, the configured and detected beams are used for both control and data transmissions on the data carrier.

In a fifth alternatives a beam may be identified as a unique combination of a "beam"/RRU ID and UE-ID (which can be substituted with a "virtual cell" ID as mentioned above).

In order to support a UE-centric RRM and mobility design, the UE will need to be periodically search for different beam-measurement resources (such as measurement RS) within a given super-cell. As mentioned previously, a UE may be aware of both a super-cell ID and at least one beam/RRU ID, or, alternatively, only beam/RRU ID(s) and the system requires the UE to configure and cycle through beam-measurement resources (such as measurement RS). In one alternative, dedicated signaling can provide a candidate set of beam/RRU IDs which the UE uses for making beam-level measurements. In another alternative, the UE may blindly detect the beam-IDs by decoding the transmissions from the nodes comprising the beams in the super-cell. Based on the detected beam-IDs the UE can form a UE-specific candidate set.

In a conventional cellular network, the RRM procedure is typically periodically performed based on higher-layer signaling and the availability of measurement resources are periodically available at predetermined locations or indicated to the UE via control signaling. However for cellular networks focused on small cell deployments with relatively small coverage radius, relatively few UEs may be simultaneously active on a given set of nodes within the same coverage radius. In order to reduce interference, support dynamic beamforming, and potentially reduce power consumption throughout the network, the resources used for RRM/mobility (e.g., sync/discovery/reference signal transmissions) may be subject to availability of the network state. For example, the network may periodically or aperiodically transition from ON to OFF states depending on the network traffic load or other system metrics.

In order to support the above procedure an "on-demand (aperiodic) beam-level RRM" procedure can be utilized. Several exemplary methods or procedures for beam-level RRM are described as follows.

Figure 7A:
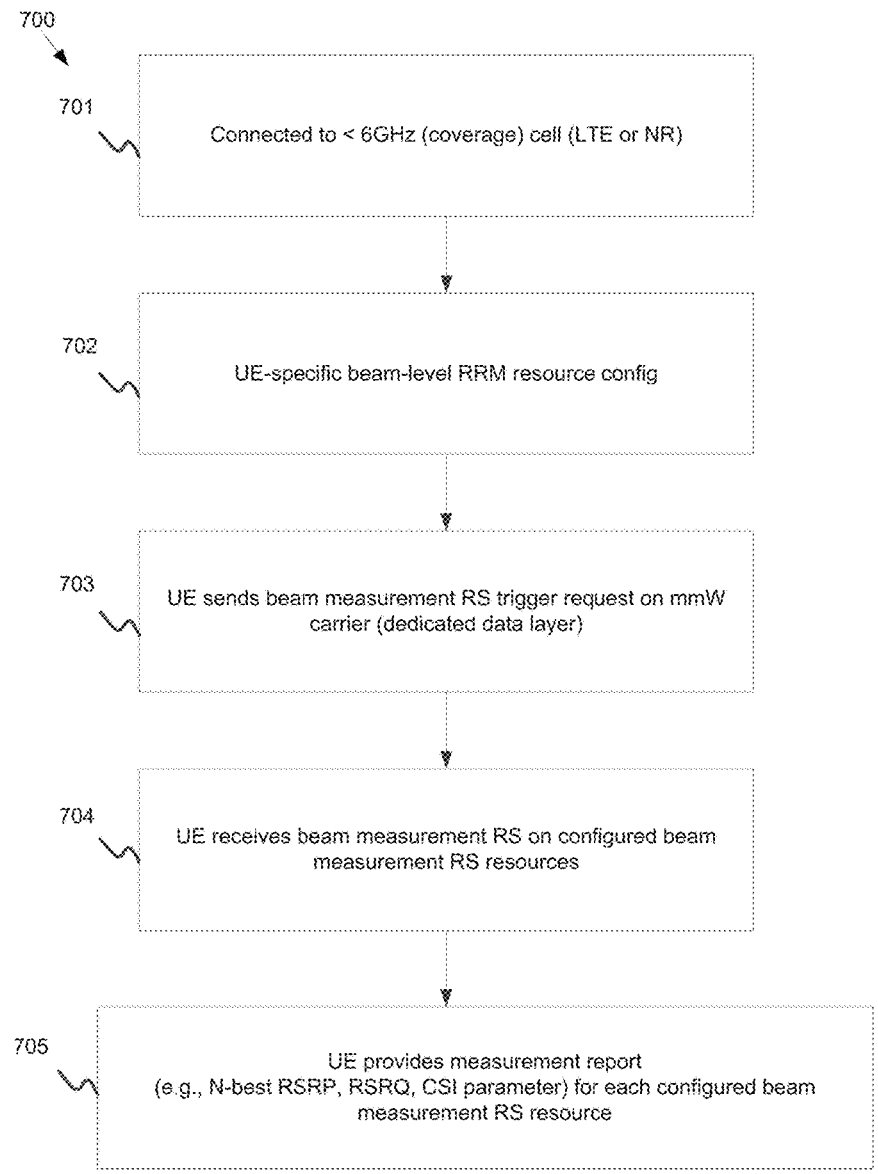
FIG. 7A illustrates an example procedure where a coverage layer/carrier and at least one beam or radio resource unit (RRU) or data carrier is configured for a UE according to various embodiments of the present disclosure.

The flow diagram in FIG. 7A illustrates the steps comprising an exemplary procedure where a coverage layer/carrier and at least one beam/RRU (or data carrier) is configured for a UE according to various embodiments of the present disclosure. For example, according to method 700 of FIG. 7A, a UE can enter the coverage of a cell operating at the LB (<6 GHz, either LTE or 5G NR) and begin association (cf. the first scheme in the present disclosure). Once connected (step 701), the network can determine that service can be provided to this UE on one of the higher frequency carriers which requires performing beam-level RRM measurement (e.g., on the "beam"/RRU measurement RS, also termed the BRS for illustrative purposes) before association can be achieved on the data carrier as well.

A configuration can be provided to the UE for performing beam-level RRM (step 702 wherein the UE receives such beam-level RRM resource configuration). For example the configuration can include a list of carrier frequencies, a list of configured carriers (analogous to primary carrier and a set of secondary carriers in LTE), time/frequency resource for the BRS, beam IDs, and resources for BRS triggers/requests and measurement reports (that is, a list of parameters pertinent to the "beams"/RRUs for the UE to measure and/or monitor). This configuration can be sent to the UE via higher layer (such as RRC) signaling, MAC control, or physical layer signaling as a part of system information or downlink control information. Additionally a beam resource (e.g., BRS or "beam"/RRU measurement RS or "beam"/RRU ID) cycling or monitoring pattern can be configured which indicates the order in which the UE will perform beam-level RRM. Once the UE receives the RRM configuration, it can determine whether to begin the RRM procedure on the data carrier.

Subsequently, the UE sends a BRS trigger request to the network (step 703). This BRS trigger request is intended to request the network to transmit at least one BRS to the UE (via at least one TRP). In a first alternative, the BRS trigger request for the network to send the BRS can be sent by the UE on an UL resource (for example, dedicated control, data transmission or a dedicated PRACH resource) on the dedicated data (e.g., >6 GHz SCell) carrier. Examples of dedicated control include physical layer dedicated control and MAC layer dedicated control such as MAC control element. This is beneficial because a TRP operating on the data carrier which is associated BRS know that the UE is currently within coverage of the TRP. In a second alternative the trigger/request can be sent by the UE on an UL resource (either for dedicated control or data transmission) on the coverage carrier. In both the first and the second alternatives, the UE can trigger the network to send BRS on the configured resources via a set of TRPs operating on a data carrier. The set of TRPs involved in transmitting to the UE is transparent to the UE. In a third alternative, a periodically configured set of BRS resources are utilized and the UE provides a measurement report after detecting the periodic BRS resources. In a fourth alternative, a hybrid approach can be utilized where the UE first detects a set of periodic BRS resources and then sends a BRS trigger/request on either the coverage or data carrier(s) where the network sends additional BRS resources. The periodic BRS resources can be used for coarse beam alignment, whereas the additional BRS resources sent upon BRS trigger/request can be used for fine beam alignment.

The BRS trigger request can also comprise an indication of one or more carriers on which a UE will perform BRS measurement. A set of "beam"/RRU IDs or, alternatively, a UE-ID can be provided in the BRS trigger. Additionally a beam-related resource or an indication thereof (such as BRS or "beam"/RRU ID) cycling or monitoring pattern can be configured which indicates the order in which the UE will perform beam-level RRM. Furthermore, information about UE capabilities, including number of transmit/receive chains for multi-antenna or antenna ports and beamforming support can also be included in the trigger.

Once the BRS trigger request is received by the network, the TRPs involved in transmitting to the UE can transmit the BRS on the configured resources, including one or more beams which the UE can detect as part of the RRM procedure (step 704). The UE can receive and detect one or more "beam"/RRU IDs carried by the BRS and, subsequently, report the IDs along with signal quality/interference measurements (step 705). Such signal quality measurement and report can include RS quality such as that analogous to LTE RSRP (which includes at least one RSRP report) or RSSI or RSRQ, or, alternatively, a part of CSI reporting/feedback (which can include CQI, RI, PMI, and/or beam index or CSI-RS resource index). The number of reported beam/RRU IDs, or a list of reported "beam"/RRU IDs, can be configured and/or indicated in the BRS trigger request or, for a later embodiment, presence/scheduling indicator. Alternatively, it can be configured via higher layer signaling as a part of RRM resource configuration. Alternatively, it can also be signaled via a MAC control element, or physical layer signaling as a part of system information.

Figure 7B:
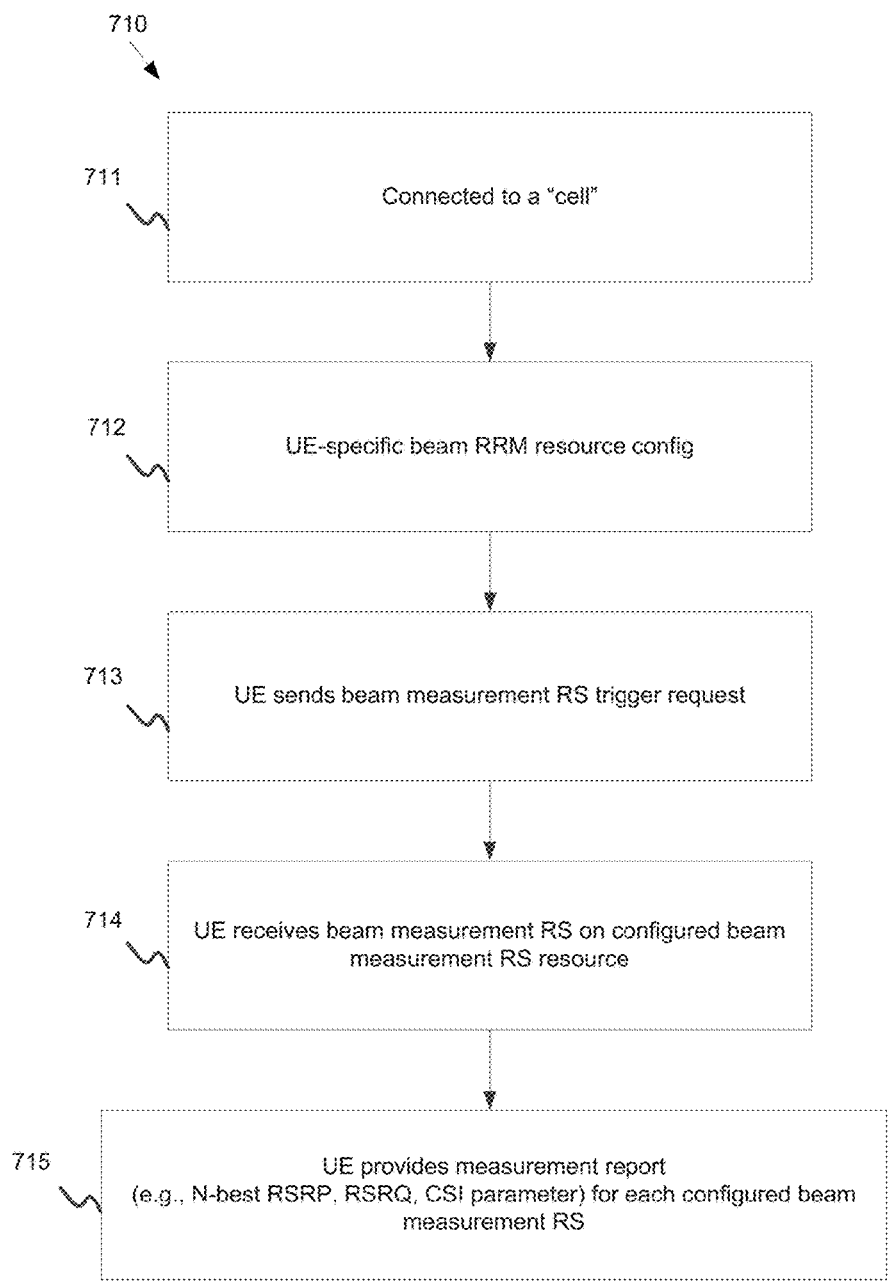
FIG. 7B illustrates a variation of the procedure in FIG. 7A wherein a UE is first connected to a "cell" (instead of a coverage carrier)

A variation of the above exemplary procedure in FIG. 7A is described in method 710 of FIG. 7B wherein a UE is first connected to a "cell" in step 711 (instead of a coverage carrier). This "cell" can be a conventional cell, a "virtual cell," or a "super cell" that provides basic coverage to the UE. Additionally, dedicated data layer/carrier at mmWave in FIG. 7A is replaced by "beam"/RRU allocated to the UE (in steps 712, 713, 714, and 715). Each of these two entities ("cell" and "beam"/RRU) is not constrained to any carrier frequency. For example, both can be associated with different frequency carriers in sub-6 GHz (LB) or with different frequency carriers in mmWave (MB/HB). Alternatively, both can be associated with a same frequency carrier, either sub-6 GHz (LB) or mmWave (MB/HB).

The BRS trigger request is intended to request the network to transmit at least one BRS to the UE (via at least one TRP). The BRS trigger request can also comprise an indication of the presence of BRS on at least one "beam" or RRU on which a UE will perform BRS measurement. A set of "beam"/RRU IDs or, alternatively, a UE-ID can be provided in the BRS trigger. Additionally a beam-related resource or an indication thereof (such as BRS or "beam"/RRU ID) cycling or monitoring pattern can be configured which indicates the order in which the UE will perform beam-level RRM.

Figure 7C:
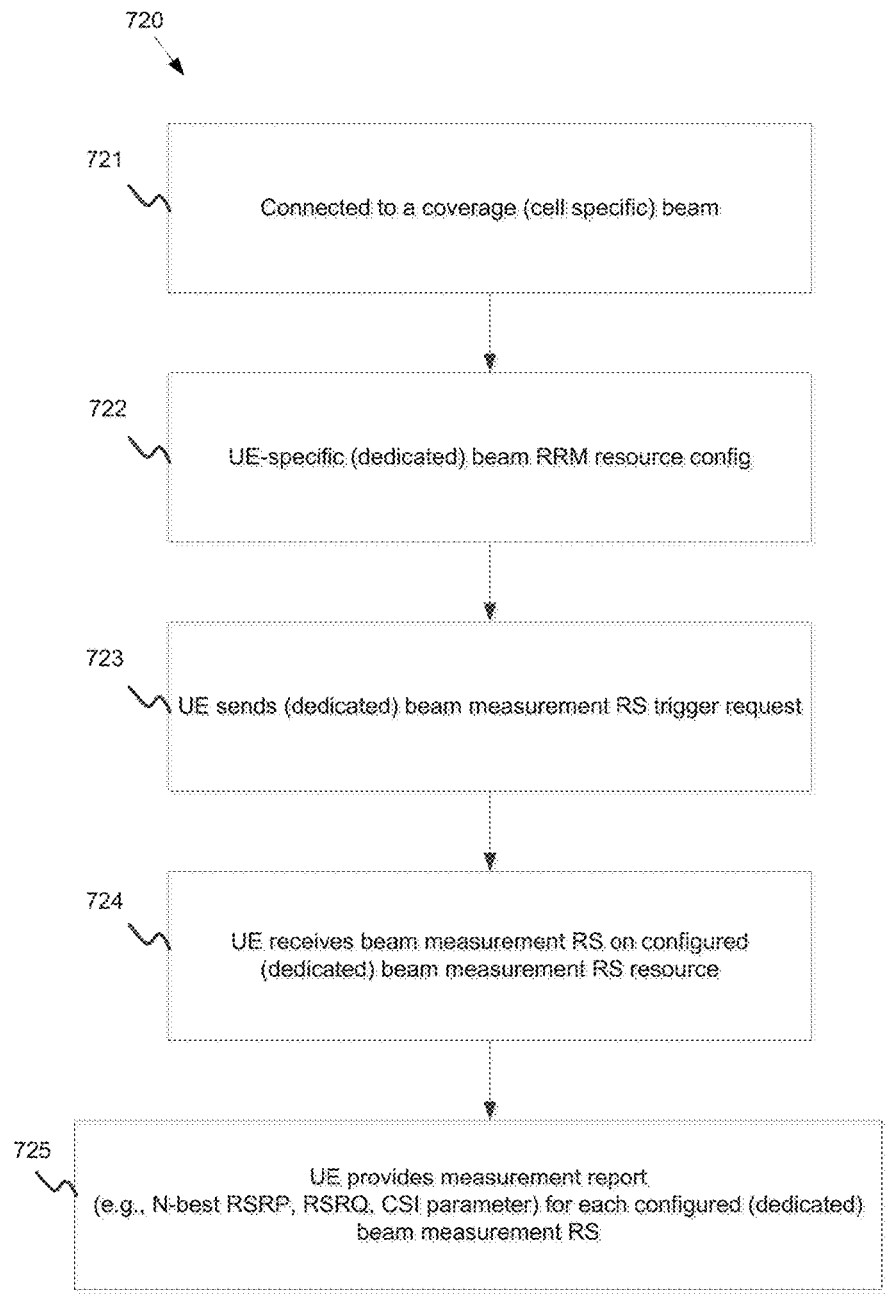
FIG. 7C illustrates a variation of the procedure in FIG. 7A wherein a UE is first connected to a coverage beam which can be cell-specific or UE-specific.

Yet another variation of the above exemplary procedure in FIG. 7A is described in method 720 of FIG. 7C wherein a UE is first connected to a coverage beam/RRU which can be cell-specific or UE-specific (721). This procedure applies, for example, when a UE is already connected to the network and a "cell". This "cell" can be a conventional cell, a "virtual cell," or a "super cell". Within this "cell", the UE is further connected to a coverage beam. Additionally, dedicated data layer/carrier at the mmWave regime in FIG. 7A is replaced by dedicated (UE-specific) "beam"/RRU (steps 722, 723, 724, and 725). For instance, a dedicated "beam"/RRU can be more refined (narrower) than a coverage "beam"/RRU. Therefore, the exemplary procedure in FIG. 7C represents a two-level "beam"/RRU-level RRM procedure. For a given UE, beam association can change from one dedicated beam to another within a same coverage beam. Likewise, extending the exemplary procedure in FIG. 7B, beam association can change from one coverage beam to another within a same "cell." For the example in FIG. 7C, the number of layers involved in dedicated beam/RRU change can be the same or smaller than that involved in coverage "beam"/RRU change.

The BRS trigger request is intended to request the network to transmit at least one BRS to the UE (via at least one TRP). The BRS trigger request can also comprise an indication of the presence of BRS on at least one "beam" or RRU on which a UE will perform BRS measurement. A set of "beam"/RRU IDs or, alternatively, a UE-ID can be provided in the BRS trigger. Additionally a beam-related resource or an indication thereof (such as BRS or "beam"/RRU ID) cycling or monitoring pattern can be configured which indicates the order in which the UE will perform beam-level RRM.

Figure 7D:
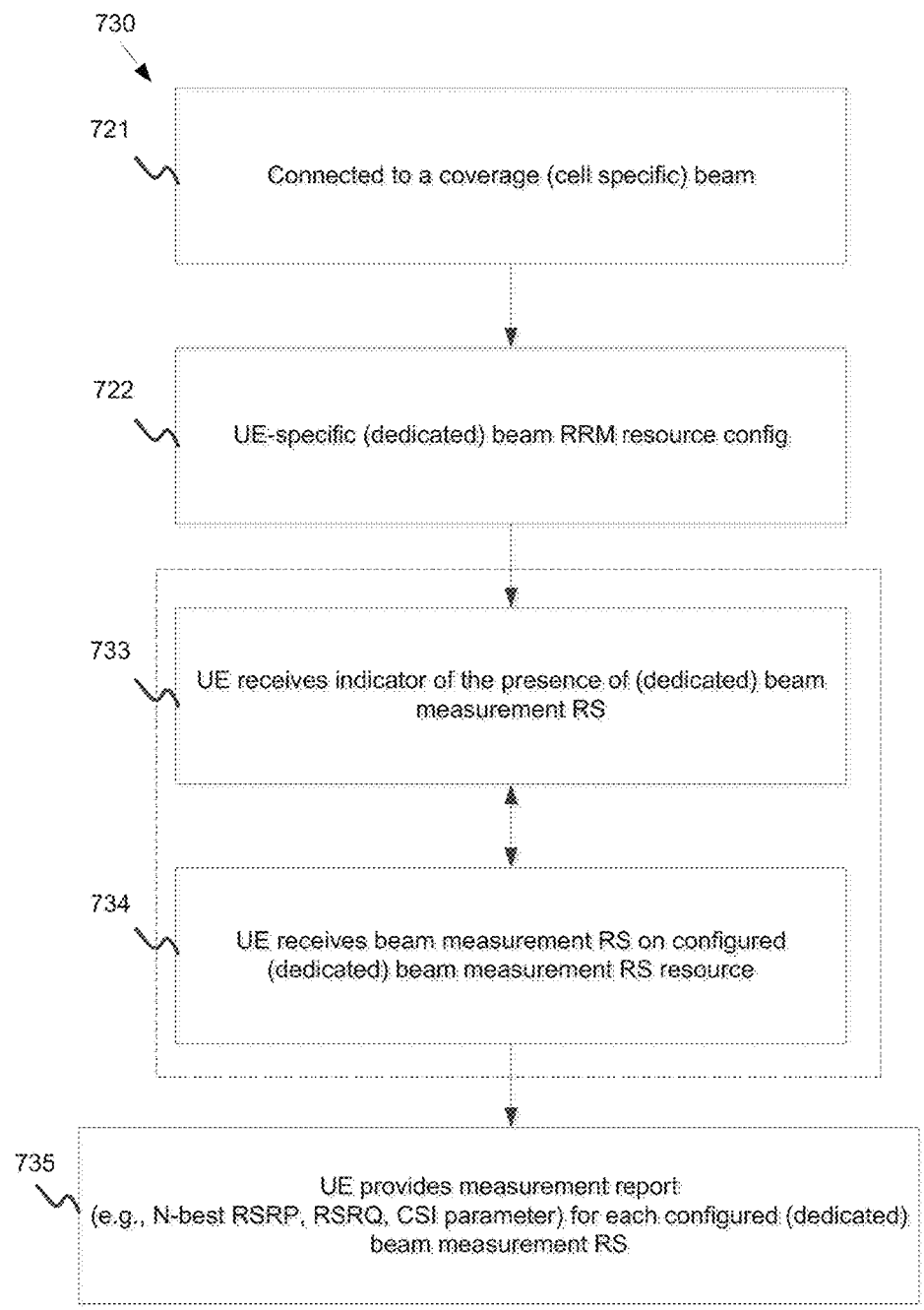
FIG. 7D illustrates a variation of the procedure in FIG. 7C wherein instead of the UE triggering the network to transmit beam measurement RS (BRS) to the UE, the network transmits an indicator of the presence of at least one BRS dedicated to the UE.

A variation of the above exemplary procedures in FIG. 7C is described in method 730 of FIG. 7D wherein, instead of the UE triggering the network to transmit "beam"/RRU measurement RS (or referred as BRS for brevity) to the UE, the network transmits an indicator of the presence of at least one BRS dedicated to the UE. That is, the network, via a DL transmission to the UE, aperiodically schedules a transmission of at least one dedicated BRS (step 733). Therefore, this BRS presence or scheduling indicator functions as a trigger to the UE to receive and measure each of the scheduled BRS(s) (step 734) and, subsequently, send a measurement report associated with each of the scheduled BRS(s) (step 735). Consequently, this indicator can also be termed a measurement report trigger associated with BRS. Such BRS measurement and report can include parameters such as that analogous to LTE RSRP (which includes at least one RSRP report) or RSSI or RSRQ, or, alternatively, a part of CSI reporting/feedback. If reported as a part of CSI reporting/feedback, this can include CQI, RI, PMI, and/or beam index (BI) or measurement RS resource index.

The BRS scheduling/presence indicator (or the measurement report trigger) can comprise an indication of the presence of BRS on at least one "beam" or RRU on which a UE will perform BRS measurement. A set of "beam"/RRU IDs or, alternatively, a UE ID can be provided in the scheduling indicator. Additionally a beam-related resource or an indication thereof (such as BRS or "beam"/RRU ID) cycling or monitoring pattern can be configured which indicates the order in which the UE will perform beam-level RRM.

In addition, the BRS scheduling/presence indicator can indicate the location of the scheduled BRS (in time and/or frequency domain) either implicitly or explicitly. For instance, if the scheduled "beam"/RRU measurement RS (BRS) is always transmitted in a same subframe or TTI as the scheduling indicator, the time-domain location of the scheduled BRS can be implicitly inferred from the location of the scheduling/presence indicator (that is, the subframe of TTI containing the BRS) without any additional signaling. However, if the scheduled "beam"/RRU measurement RS (BRS) can be transmitted at a different time-domain location from that of the scheduling/presence indicator, some additional hypotheses (hence additional signaling bits) are needed to indicate the time-domain (subframe of TTI) location of the BRS. Likewise, if the scheduled "beam"/RRU measurement RS (BRS) is always transmitted in a certain fixed frequency-domain location (a same number of frequency resource blocks and location(s)), the frequency-domain location of the scheduled BRS is known by the UE without any additional signaling. However, if the scheduled "beam"/RRU measurement RS (BRS) can be transmitted at different frequency-domain locations, some additional hypotheses (hence additional signaling bits) are needed to indicate the frequency-domain location (number of frequency resource blocks and location(s)) of the BRS.

The scheduling/presence indicator can indicate the scheduling/presence of only one BRS transmission ("one-shot" approach) and be signaled via a DL control channel (analogous to PDCCH in LTE) and included as a field in downlink control information (DCI). This DCI can be associated with either DL or UL or both DL/UL assignments/grants.

Alternatively, the BRS scheduling/presence indicator can indicate the scheduling/presence of at least one (a series of L>1) BRS transmission ("L-shot" approach). This indicator can be signaled via a DL control channel (analogous to PDCCH in LTE) and included as a field in downlink control information (DCI). Likewise, this DCI can be associated with either DL or UL or both DL/UL assignments/grants.

At least two signaling possibilities exist. First, the indicator is signaled in one usage of PDCCH by including an additional field which indicates the number of BRS consecutive BRS transmissions (L>1). The transmission interval of this BRS can be preconfigured via higher layer signaling (for instance, as a part of BRS resource configuration) or indicated via dynamic signaling together with the number of BRS consecutive BRS transmissions (L>1). Second, the indicator is signaled in two usages of PDCCH which correspond to activation and deactivation, respectively.

Analogous to the first possibility, the transmission interval of this BRS can be preconfigured via higher layer signaling (for instance, as a part of BRS resource configuration) or indicated via dynamic signaling together with the number of BRS consecutive BRS transmissions (L>1). Alternatively, instead of using a DL control channel (analogous to PDCCH in LTE) and a field in a downlink control information (DCI), this L-shot BRS transmission can be supported with MAC layer signaling via MAC control element (which can activate and deactivate the BRS transmission). Likewise, analogous to the first possibility, the transmission interval of this BRS can be preconfigured via higher layer signaling (for instance, as a part of BRS resource configuration) or indicated via dynamic signaling together with the number of consecutive BRS transmissions (L>1). In this case, since the BRS scheduling/presence indicator also functions (can also be perceived) as the measurement report trigger, an L-shot BRS transmission implies that the UE should calculate and report a measurement report associated with distinct L BRS instances (shots). These L measurement report components can either be reported together in one transmission instance or reported in a plurality of transmission instances.

Compared to the UE-triggered/initiated BRS transmission in FIG. 7C (where some latency exists between the UE trigger and the BRS transmission), the network-initiated BRS transmission in FIG. 7D does not necessarily incur any latency between the transmission of the scheduling/presence indicator and the BRS transmission. This especially holds if BRS is transmitted in the same (DL) subframe or TTI as the scheduling/presence indicator (for instance, included in a DL control channel in the same DL subframe or TTI).

Although the exemplary method in FIG. 7D is described as a variation of the method in FIG. 7C (where the triggered BRS is associated with a dedicated "beam"/RRU for a UE connected to a coverage beam), an analogous variation of the method in FIG. 7A (where the triggered BRS is associated with a "beam"/RRU for a UE connected to a "cell" or "super-cell") or FIG. 7B (where the triggered BRS is associated with a dedicated data carrier for a UE connected to a coverage carrier) can be straightforwardly inferred by those skilled in the art.

Figure 7E:
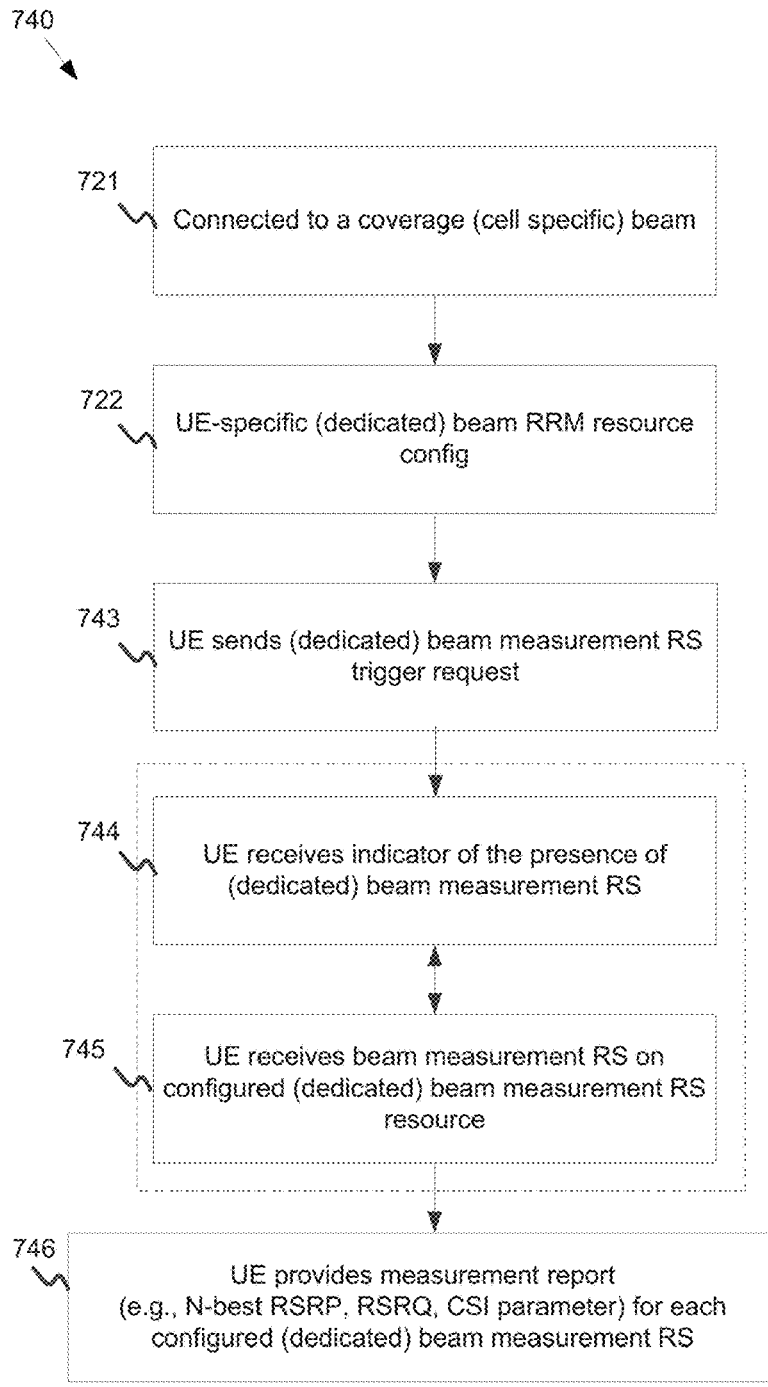
FIG. 7E illustrates a variation of the procedure in FIG. 7D wherein the UE sends BRS trigger request which triggers the network to transmit BRS to the UE.

A variation of the above exemplary procedures in FIG. 7D is described in method 740 of FIG. 7E wherein the UE sends BRS trigger request (step 743) which triggers the network to transmit BRS to the UE. Subsequently, the network transmits an indicator of the presence of at least one BRS dedicated to the UE (step 744). That is, the network, via a DL transmission to the UE, schedules a transmission of at least one dedicated BRS upon request by the UE and, thus, triggers the UE to receive and measure each of the scheduled BRS(s) (step 745), and, subsequently, send a measurement report associated with each of the scheduled BRS(s) (step 746).

Therefore, the BRS trigger request in method 740 is a request from the UE for the network not only to indicate a presence/scheduling of BRS, but also to trigger a BRS measurement report. There are two alternatives. First, this trigger request is used only to request a trigger for a measurement report. This alternative can be used for both periodic and aperiodic BRS (that is, whether the BRS is transmitted by the network or at least one TRP periodically or aperiodically—hence measured by UE periodically or aperiodically). Second, this trigger request is used to request a trigger for a measurement report as well as a transmission/scheduling of BRS. This second alternative is used for aperiodic BRS (that is, BRS is transmitted by the network or at least one TRP only when it is requested/triggered by the UE).

Such BRS measurement and report can include parameters such as that analogous to LTE RSRP (which includes at least one RSRP report) or RSSI or RSRQ, or, alternatively, a part of CSI reporting/feedback. If reported as a part of CSI reporting/feedback, this can include CQI, RI, PMI, and/or beam index (BI) (at least one BI value) or measurement RS resource index.

In the third scheme, a beam measurement RS (BRS) design is described. The BRS used for beam-level RRM and mobility can be designed considering the dynamic beamforming and on/off operation. BRS measurement report is expected once the measurement quantity (for instance, RSRP/RSSI/RSRQ as discussed above) exceeds a minimum threshold or corresponds to a configured measurement instance (e.g., out-of-range may be reported). In one alternative, the BRS measurement and reporting can be based on 'one-shot' measurements comprising a single BRS instance.

In a second alternative, the BRS measurement can be averaged by the UE across multiple CRS instances and a reported value is provided based on a configured performance requirement on accuracy. The BRS design can comprise multiple time/frequency resources sending one or more signals and messages alone or in combination. For example, a BRS instance can be uniquely identified by a combination of "beam ID" (or cell ID) and UE-ID. In addition, the time/frequency allocation for BRS resources needs to be known at the UE before beam-level RRM procedures can be used.

The following options describe different methods for configuring/indicating the BRS resources. In a first option, BRS resource configuration is fixed in the specification. In a second option, BRS resource configuration is provided by system information (either on the coverage or data carrier when the embodiment described in FIG. 7A is used). In a third option, BRS resource configuration is provided in UE-specific configuration.

Another functionality which can be supported by the BRS is to provide time/frequency synchronization at the UE. While conventional cellular networks require significant network planning to maintain orthogonality between the synchronization sequences transmitted by different cells, due to the dynamic beamforming, such strict orthogonality may not be required when, for example, a large range of values or supporting reuse of "beam"/RRU ID by utilizing a combination of "beam"/RRU ID, "super-cell" ID, and/or UE ID carried by the BRS is utilized.

In the fourth scheme, a method for beam association which follows beam-level RRM is described. As described in the previous schemes, the UE transmits a BRS trigger request based on a set/sub-set of configured candidate BRS (or "beam"/RRU measurement RS) resources or beam/RRU IDs, followed by one or more TRPs (where TRP selection is transparent to the UE) transmitting on BRS resources. The number of BRS measurements to report can be scaled with network density and UE capability. Given this candidate set, the UE monitors signal quality or strength associated with each of the candidates (BRS resources or "beam"/RRU IDs) by measurement the corresponding beam measurement RS (BRS).

Figure 8:
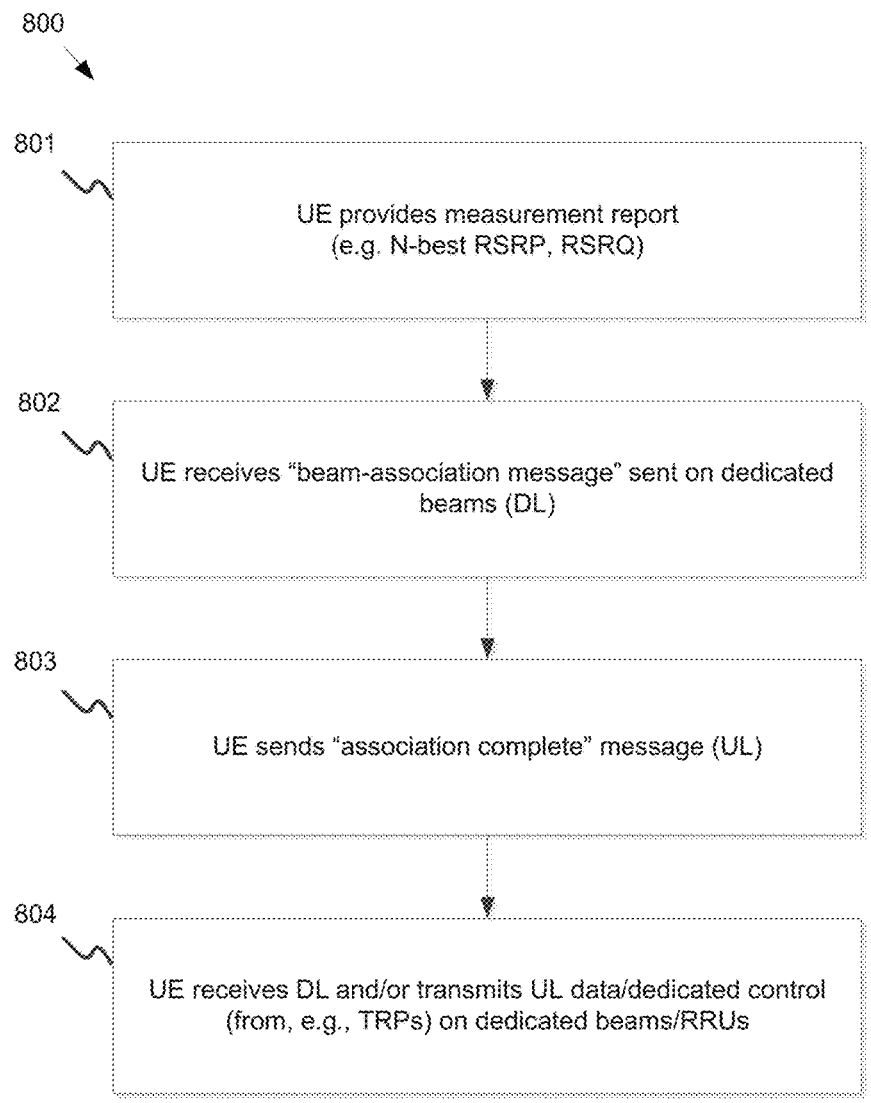
FIG. 8 illustrates an example embodiment wherein an exemplary beam measurement, reporting, and association procedure which a UE is engaged in a radio resource management (RRM) procedure with the network according to various embodiments of the present disclosure.

FIG. 8 illustrates a method 800 wherein an exemplary beam measurement, reporting, and association procedure which a UE is engaged in a RRM procedure with the network according to various embodiments of the present disclosure. For example, the method 800 can be performed by the UE 116. Based on the reported measurements from the UE, the network can reconfigure the candidate set based on a hierarchical approach. This reconfiguration can follow an iterative reselection procedure. For example, aperiodic triggers (for example, based on UE measurement events) or periodic triggers can be configured at (or signaled to) the UE to indicate if/when a candidate set of "beams"/RRUs (or corresponding indicators) is updated. Upon receiving the trigger, the UE reads the candidate set reconfiguration message to obtain an updated candidate set. This information can be transmitted to the UE via various means such as higher-layer signaling (RRC), MAC control information, or physical layer control in the form of system information.

Upon receiving a candidate set information (denoted as Set 1), the UE measures an associated set of "beam"/RRU measurement RSs and reports a corresponding set of measurements to the network (step 801). These reports can be sent via an uplink channel (either the UL data channel or a special UL channel including a random access channel or an UL control channel). After such RRM measurement reports (reported by the UE), a "beam association" message is sent (by the network) on each of the beams/RRUs (in Set 1) and received by the UE (step 802). These association messages can be sent at a preconfigured delay after the BRS transmissions or BRS measurement reporting instances. These messages are analogous to grants or assignments for the UE to transmit and/or receive on a set of beams/RRUs (Set 2). This set of "beams"/RRUs (Set 2) can be a subset of the aforementioned candidate set of beams for the purpose of RRM (Set 1). It can be configured via higher layer signaling as a part of RRM resource configuration (although resulting in high latency). Alternatively, it can be signaled via a MAC control element, or DL physical layer signaling as a part of system information. Alternatively, it can also be signaled via a DL control channel (as a DCI field in either DL or UL or both DL/UL grants/assignments; or UL HARQ channel analogous to LTE PHICH).

After the UE receives and/or detects the association messages, the UE can send a confirmation or "beam association complete" message (step 803) via an uplink channel (such as either the UL data channel or a special UL channel including a random access channel or an UL control channel). This association complete message can include an acknowledgment of a success in receiving and/or detecting the "beam association message". After association confirmation is received, the network can begin transmitting (DL) data and associated (DL) control signaling and reference signals (including reference signals other than "beam"/RRU measurement RS) on Set 2 beams/RRUs (which can be from one or more TRPs) after a configured delay. The UE receives DL and/or transmits UL data/dedicated control (from, e.g., TRPs) on dedicated beams/RRUs (step 804). This process is hierarchical since it uses a two-stage (comprising Set 1 and Set 2) beam association procedure.

In another alternative procedure, aimed for reducing beam association latency, the UE can provide a CSI or a report analogous to LTE buffer status report (BSR) feedback as a part of the association message exchange. These reports can be sent via an uplink channel (either the UL data channel or a special UL channel including a random access channel or an UL control channel).

In another alternative procedure, the association procedure can be performed on the coverage carrier or concurrently with the beam-level RRM procedure. For example, the network can include the "beam association message" in the BRS and the UE can provide the "beam association complete" response in the same message as the beam measurement report.

Figure 9:
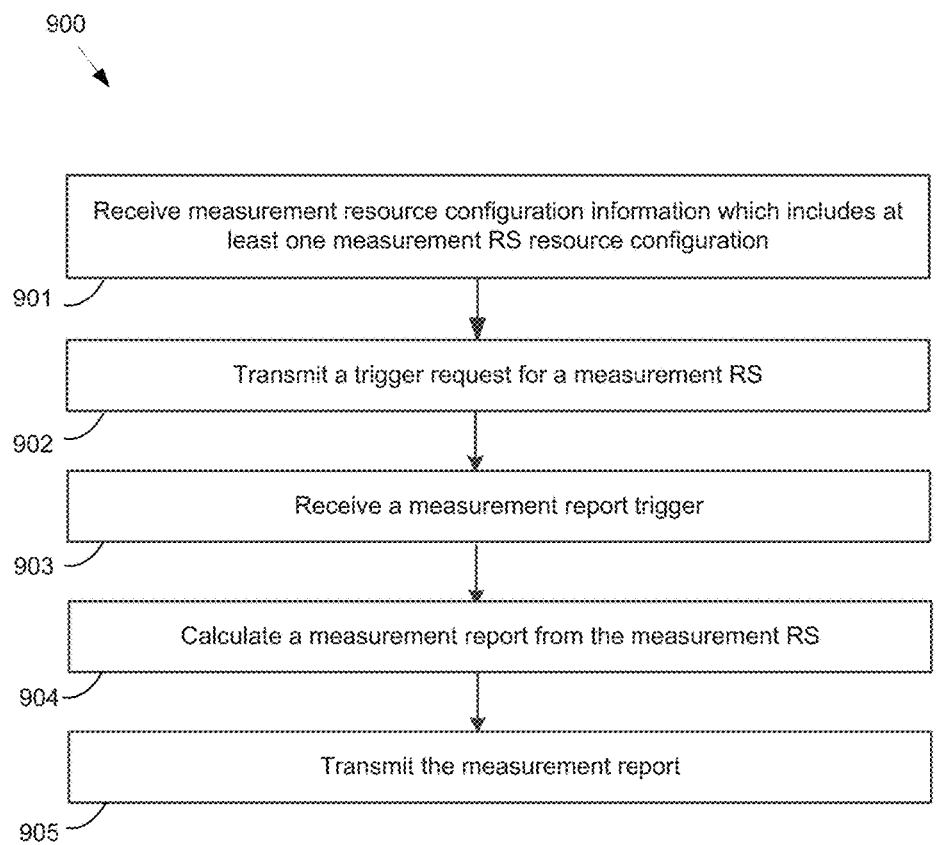
FIG. 9 illustrates an example method wherein a UE is configured with a RRM procedure corresponding to a radio resource unit (RRU) according to an embodiment of the present disclosure according to various embodiments of the present disclosure.

FIG. 9 illustrates an example method 900 wherein a UE is configured with a radio resource management (RRM) procedure corresponding to a radio resource unit (RRU) according to an embodiment of the present disclosure according to various embodiments of the present disclosure. For example, the method 900 can be performed by the UE 116.

The method begins with step 901, wherein the UE receives measurement resource configuration information which includes at least one measurement RS resource configuration. This measurement resource configuration is associated with a radio resource unit (RRU) such as a beam (dedicated to the UE), a carrier configured for data transmission and reception, or a secondary cell associated with a primary cell. Subsequently, the UE transmits a trigger request for a measurement RS (step 902) in accordance with the resource configuration received in step 901. Having transmitted the trigger request, the UE receives a measurement report trigger (step 903) which can also include scheduling information for the measurement RS. Upon receiving the measurement RS, the UE calculates a measurement report (step 904). This measurement report can include at least one RS received power (RSRP) report or other RS quality reports. If the RRU is a beam, the measurement report can also include at least one beam index (BI) or beam selection indicator. The UE then transmits this measurement report (step 905).

The trigger request in step 902 and the measurement report trigger in step 903 can be associated with one RRU (such as one beam) or multiple RRUs (such as L>1 beams). When L>1, step 904 is repeated for each of the L RRUs or beams. Step 905, on the other hand, can either comprise one composite transmission which includes L measurement reports, or comprise L transmissions wherein each transmission corresponds to one measurement report.

Step 905 can further be followed by the UE receiving a RRU (such as beam) association message. This association step precedes the UE being configured to transmit and receive data on that RRU (such as beam).

Figure 10:
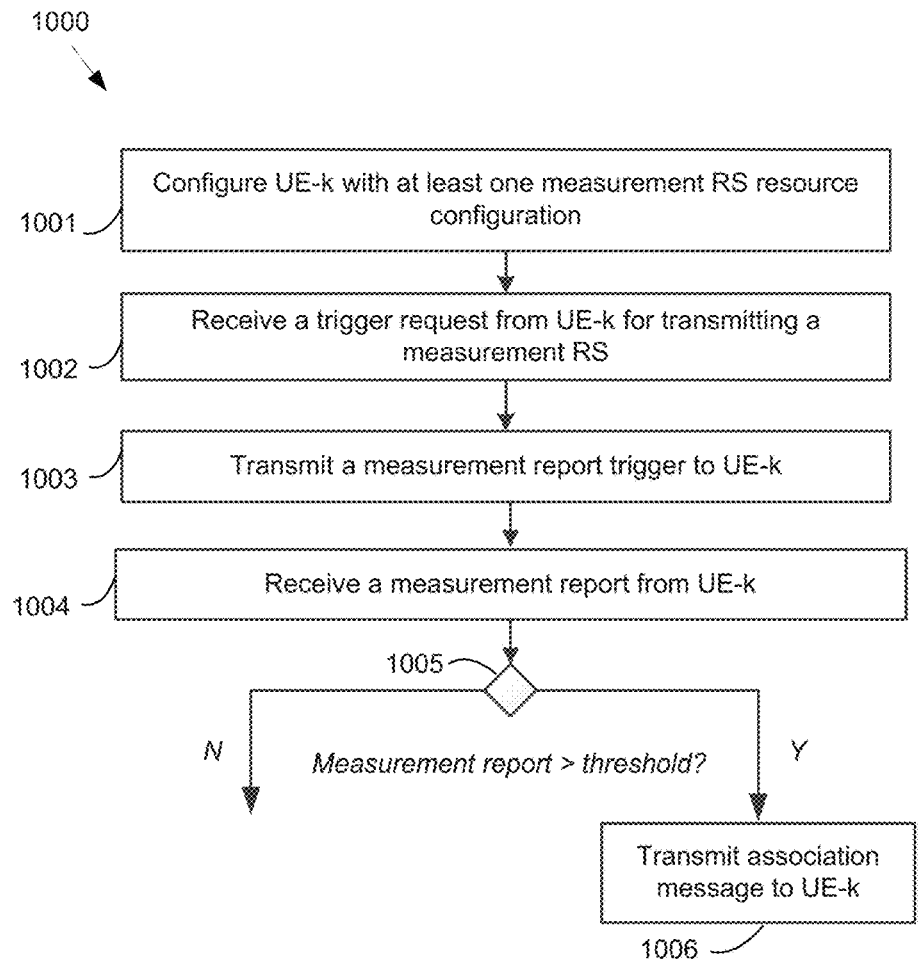
FIG. 10 illustrates an example method wherein a BS configures a UE with a RRM procedure corresponding to a RRU according to an embodiment of the present disclosure according to various embodiments of the present disclosure.

FIG. 10 illustrates an example method 1000 wherein a BS configures a UE (labeled as UE-k) with a radio resource management (RRM) procedure corresponding to a radio resource unit (RRU) according to an embodiment of the present disclosure. For example, the method 1000 can be performed by the BS 102.

The method 1000 begins with step 1001, wherein the BS configures a UE (labeled as UE-k) with at least one measurement RS resource configuration. This measurement resource configuration is associated with a radio resource unit (RRU) such as a beam (dedicated to the UE), a carrier configured for data transmission and reception, or a secondary cell associated with a primary cell. When the BS receives a trigger request for a measurement RS from UE-k (step 1002) in accordance with the resource configuration received in step 1001, the BS transmits a measurement report trigger (step 1003). This measurement report trigger can also include scheduling information for the measurement RS. The measurement RS is transmitted either together or after the measurement report trigger. Subsequently, the BS receives a measurement report from UE-k (step 1004). This measurement report can include at least one RS received power (RSRP) report or other RS quality reports. If the RRU is a beam, the measurement report can also include at least one beam index (BI) or beam selection indicator.

The trigger request in step 1002 and the measurement report trigger in step 1003 can be associated with one RRU (such as one beam) or multiple RRUs (such as L>1 beams). When L>1, the measurement report in step 904 can either comprise one composite transmission which includes L measurement reports, or comprise L transmissions wherein each transmission corresponds to one measurement report.

Upon receiving the measurement report from UE-k, the BS can decide whether to configure UE-k with a RRU or beam corresponding to the measurement report (step 1005). For example, if the measurement report comprises a beam RSRP which exceeds a given threshold, the BS will transmit a beam association message to UE-k. The association message includes, for example, a RRU (such as beam) indicator. This association procedure can be repeated for more than one RRUs or beams. That is, the BS can send a beam association message corresponding to L'≤L RRUs (or beams).

Although FIGS. 9 and 10 illustrate examples of processes for receiving configuration information and configuring a UE, respectively, various changes could be made to FIGS. 9 and 10. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
   a transceiver configured to:
      receive measurement resource configuration information that includes resource configuration for measurement reference signals (RSs), wherein each of the measurement RSs is associated with a beam;
      transmit a trigger request including a request for transmitting the measurement RSs; and
      receive a measurement report trigger for a measurement report, the measurement report trigger including scheduling information for the measurement RSs, an indication of a set of beam identifiers for the beams associated with the measurement RSs for the measurement report, and a measurement RS presence indicator; and
   at least one processor operably connected to the transceiver, the at least one processor configured to calculate, in response to receipt of the measurement report trigger, the measurement report from the measurement RSs,
   wherein the transceiver is further configured to transmit the measurement report including a plurality of radio resource indicators and at least one RS received power report.

2. The UE of claim 1, wherein the at least one processor is configured to identify the measurement RSs for the calculated measurement report based on the received measurement RS presence indicator.

3. The UE of claim 1, wherein the measurement report trigger is received in response to transmission of the trigger request.

4. The UE of claim 1, wherein the transceiver is further configured to receive at least one beam association message.

5. The UE of claim 4, wherein the transceiver is further configured to transmit at least one message indicating completion of beam association.

6. A base station (BS) comprising:
   at least one processor configured to generate configuration information to configure a user equipment (UE) with measurement reference signals (RSs), wherein each of the measurement RSs is associated with a beam; and
   a transceiver operably connected to the at least one processor, the transceiver configured to:
      receive, from the UE, a trigger request including a request for transmitting the measurement RSs;
      transmit, to the UE, a measurement report trigger to the UE for a measurement report, the measurement report trigger including scheduling information for the measurement RSs, an indication of a set of beam identifiers for the beams associated with the measurement RSs for the measurement report, and a measurement RS presence indicator; and
      receive, from the UE, a measurement report from the UE including a plurality of radio resource indicators and at least one RS received power report.

7. The BS of claim 6, wherein the measurement RSs for the measurement report is indicated based on the transmitted measurement RS presence indicator.

8. The BS of claim 6, wherein the measurement report trigger is transmitted in response to receipt of the trigger request.

9. The BS of claim 6, wherein the transceiver is further configured to receive at least one beam association message.

10. A method for operating a user equipment (UE), the method comprising:
    receiving, by the UE, measurement resource configuration information that includes measurement reference signals (RSs), wherein each of the measurement RSs is associated with a beam;
    transmitting, by the UE, a trigger request including a request for transmitting the measurement RSs;
    receiving a measurement report trigger for a measurement report, the measurement report trigger including scheduling information for the measurement RSs, an indication of a set of beam identifiers for the beams associated with the measurement RSs for the measurement report, and a measurement RS presence indicator;
    in response to receipt of the measurement report trigger, calculating, by the UE, a measurement report from the measurement RSs; and
    transmitting the measurement report including a plurality of radio resource indicators and at least one RS received power report.

11. The method of claim 10, further comprising identifying the measurement RSs for the calculated measurement report based on the received measurement RS presence indicator.

12. The method of claim 10, wherein the measurement report trigger is received in response to transmission of the trigger request.

13. The method of claim 10, further comprising receiving at least one beam association message.

14. The method of claim 13, further comprising transmitting at least one message indicating completion of beam association.

* * * * *